United States Patent [19]

Ruscev et al.

[11] Patent Number: 5,343,041

[45] Date of Patent: Aug. 30, 1994

[54] METHOD AND APPARATUS FOR DETERMINING THE PHYSICAL CHARACTERISTICS OF A WATER FLOW

[75] Inventors: Mario Ruscev, Orsay; Marc A. Pinto, Sceaux, both of France

[73] Assignee: Schlumberger Technology Corporation, Houston, Tex.

[21] Appl. No.: 81,527

[22] Filed: Jun. 23, 1993

[51] Int. Cl.⁵ .................... G01V 5/10; G01F 1/708
[52] U.S. Cl. .................... 250/270; 250/269; 250/356.1; 376/166; 376/159
[58] Field of Search .......... 250/270, 269, 356.1, 250/356.2, 259, 260; 376/166, 157, 159

[56] References Cited

U.S. PATENT DOCUMENTS

| | | | |
|---|---|---|---|
| 4,035,640 | 7/1977 | Arnold et al. | 250/270 |
| 4,047,028 | 9/1977 | Arnold | 250/270 |
| 4,232,224 | 11/1980 | Graham et al. | 250/356.2 |
| 4,287,415 | 9/1981 | Arnold | 250/270 |
| 4,574,193 | 3/1986 | Arnold et al. | 250/270 |
| 4,737,636 | 4/1988 | Smith, Jr. | 250/270 |
| 4,924,099 | 5/1990 | Lim et al. | 250/270 |
| 5,219,518 | 6/1993 | McKeon et al. | 576/166 |

FOREIGN PATENT DOCUMENTS 421844  4/1991  European Pat. Off. .

Primary Examiner—Paul M. Dzierzynski
Assistant Examiner—Drew A. Dunn
Attorney, Agent, or Firm—Henry N. Garrana; Darcell Walker

[57] ABSTRACT

A method and apparatus for studying the flow of water along a well, on the basis of a general spectrum g(t) of gamma ray detection numbers detected in a detection zone over a given detection duration and as a function of time, said gamma rays resulting from the activation of oxygen atoms in water by neutrons emitted by a source to create an activation reaction $O^{16}(n,p)N^{16}$.

28 Claims, 5 Drawing Sheets

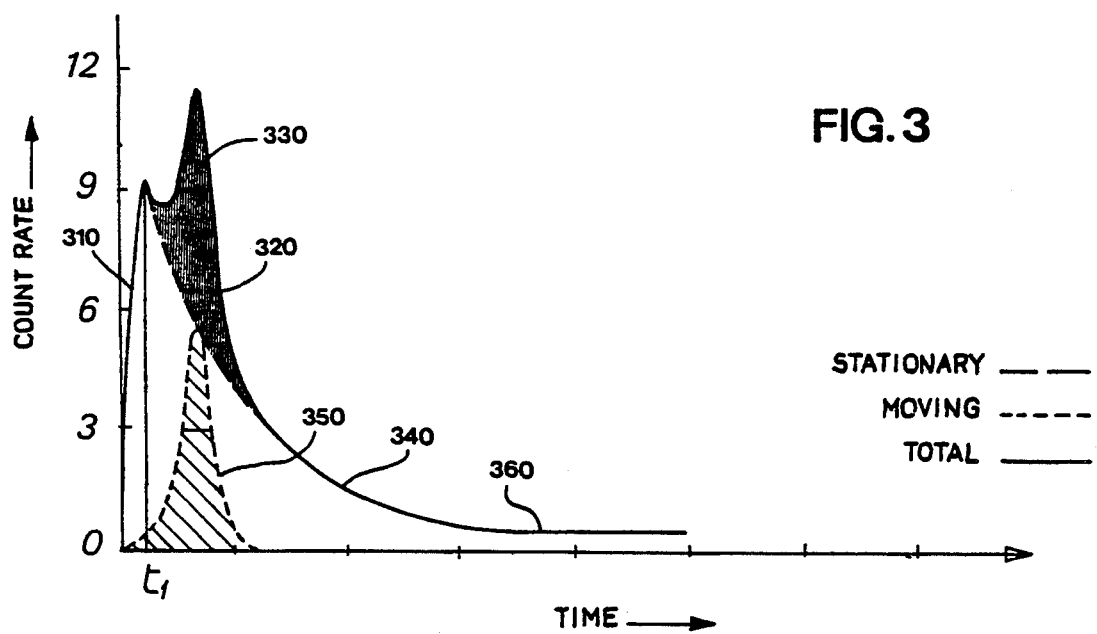
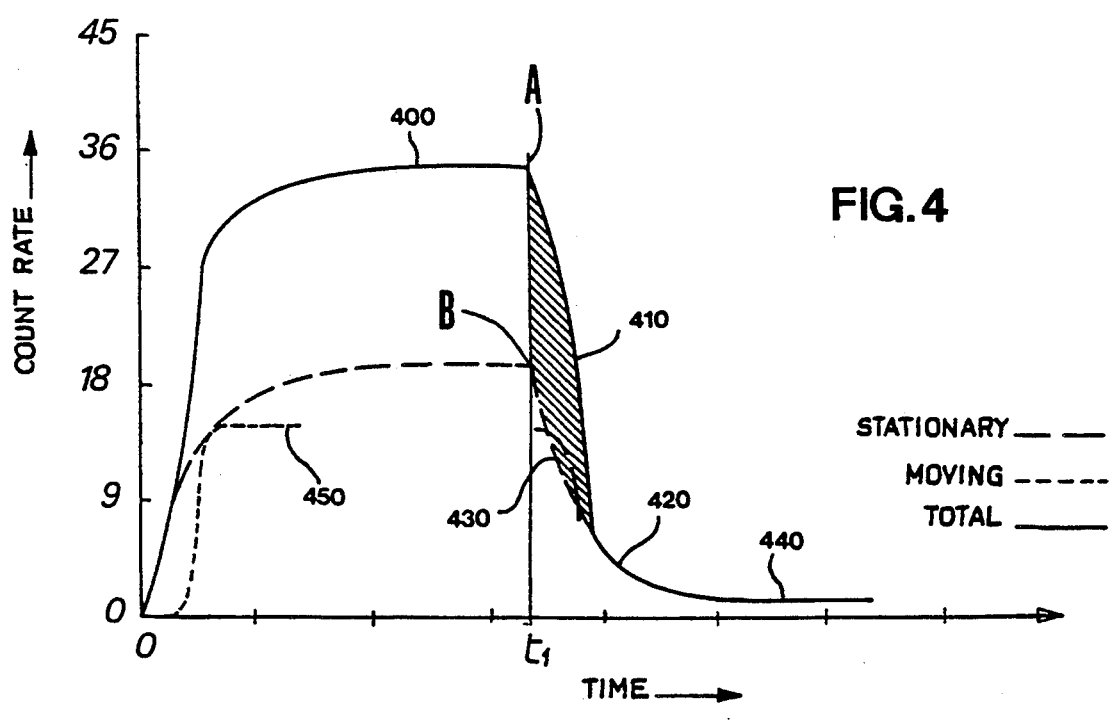

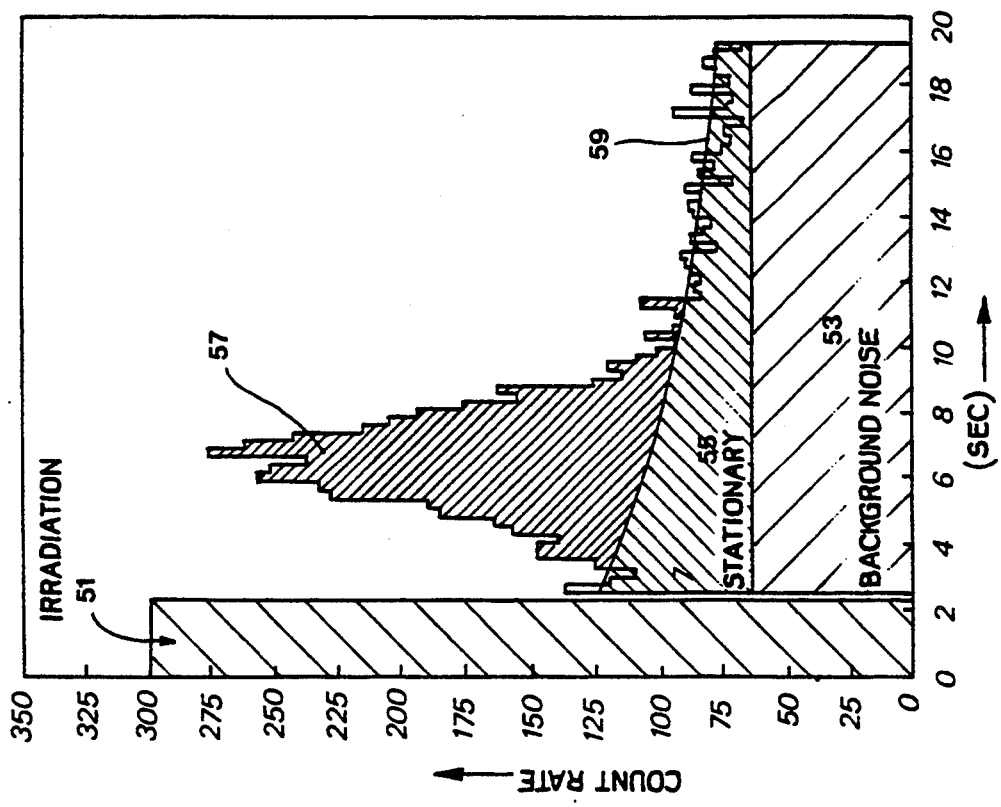
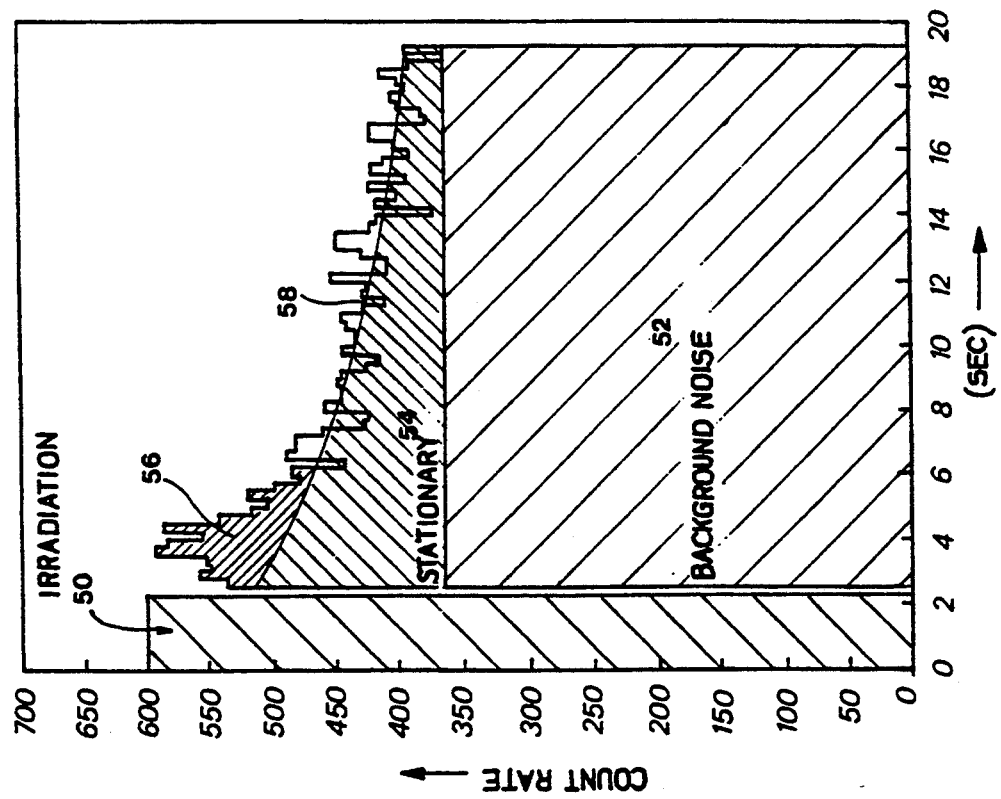

METHOD AND APPARATUS FOR DETERMINING THE PHYSICAL CHARACTERISTICS OF A WATER FLOW

FIELD OF THE INVENTION

The present invention relates to a method and an apparatus for determining the physical characteristics of a water flow, and more particularly the flow rate of a water flow to which it is not possible to gain direct access, for example in a pipe, or a flow of water coming from a hydrocarbon-producing well.

The present invention may advantageously be applied to the field of hydrocarbon well operations, making use either of production logging techniques for evaluating hydrocarbon-producing wells, or well injection techniques in order to determine the tightness of such wells.

The present invention makes it possible to obtain qualitative and/or quantitative information relating to a water flow, either in the well (regardless of whether the flow is inside the production tubing or outside it), or else at the surface in a pipe connecting the well to a storage tank and conveying a mixture of water and of hydrocarbons (possibly together with gas).

BACKGROUND OF THE INVENTION

In well logging techniques, a metal pipe known as "casing" is placed inside a well for the purpose of consolidating it, and cement is injected in the annular gap between the casing and the surrounding ground. Perforations are then made through the casing and the cement at a level where the earth formations are expected to produce hydrocarbons, so as to allow the hydrocarbons to flow towards the surface up a production tubing previously disposed coaxially inside the casing.

It is most important to have knowledge of zones in which fluid enters the well and zones in which it leaves the well, and to ensure that the annular cement-filled space between the casing and the ground is fluidtight. However, underground formations contain fluids other than hydrocarbons, in particular water and sometimes gas. Owners and/or operators of hydrocarbon wells are interested in producing hydrocarbons and possibly gas, with the production of water constituting a handicap and an operating loss. Unfortunately, it happens relatively frequently that undesirable flows of water appear in the cement in a longitudinal direction parallel to the well between the casing and the ground. This phenomenon has the undesirable effect of communicating with one another underground formations that are located at different depths, i.e. that are at different pressures, thereby enabling water from a first formation to mix with hydrocarbons from another formation situated at a different depth along the well.

The invention may also be implemented in production wells, and more particularly in so-called "injection" wells, which term covers various families of wells. In a first family, fluid is injected at high pressure into a first well in order to cause hydrocarbons in the underground formations to move towards a second well adjacent to the first, thereby causing it to become a production well. A second family of injection wells is intended to receive fluids for storage purposes, either fluids that result from hydrocarbon production such as brine, or else liquid wastes. In both of these families of injection wells, it is important to ensure that such a well is fluidtight in order to prevent the fluids that are injected contaminating under ground sources of drinking water (the water table). Such contamination is generally due to cracks or passages through the annular portion filled with cement and/or in the ground in the proximity of the wall of the well. To this end, injection wells are generally subjected to surveys prior to injection and also to periodic inspections for verification purposes.

The invention may also be applied to determining the quantity of water flowing in a pipe that conveys a mixture of water and of hydro carbons. This applies, for example, to a pipe running from a hydro carbon-producing well and conveying the hydrocarbons (possibly mixed with water) to a storage tank. The operator then needs to know whether the fluid leaving the well is constituted entirely of hydrocarbons, and if not, the operator needs to know how much water is mixed in with the hydrocarbons.

It will thus be understood that the method of the invention is advantageously applicable to determining information relating to a flow of water when the flow takes place under physical conditions that make direct measurement impossible, e.g. in a hydrocarbon well or in a pipe conveying a mixture of water and hydrocarbons in unknown proportions.

Of the various methods that have already been proposed for detecting and determining the characteristics of a flow of water in a well, whether inside casing or between the casing and the ground, the nuclear method based on oxygen activation seems to be promising. This method has been known, in its application to oil well logging at least since 1967, as can be seen from the article "Advances in nuclear production logging" by P. A. Wichmann et al., Transactions SPWLA (1967). The method is implemented by means of a tool or sonde including a nuclear source suitable for emitting high energy neutrons, and a detector for detecting gamma radiation. The neutrons emitted by the source are at an energy such that they interact with the atoms of oxygen in the water so as to "activate" these atoms, i.e. transmute them into the form of unstable nitrogen $N^{16}$. Atoms of $N^{16}$ nitrogen return to a stable state in the form $O^{16}$ oxygen in compliance with an exponential time relationship having a half-life of 7.13 seconds, and in so doing they emit gamma radiation at 6.13 MeV and at 7.12 MeV. This activation reaction is also known as the $O^{16}(n,p)N^{16}$ reaction. The count rate in the gamma ray detector (corresponding to the number of gamma particles detected) is proportional to the total quantity of oxygen present around the sonde, and thus to the water flow rate.

Various attempts have been made at implementing methods and providing operational probes capable of being used in hydrocarbon wells. Most of these methods rely on the ratio between the number of photons detected by two different gamma radiation detectors that are longitudinally spaced apart relative to the neutron source.

However, those known methods relying on two detectors suffer from drawbacks.

Downhole measurements require very long measuring time, up to several minutes. Unfortunately, time is an extremely important factor when operating hydrocarbon wells, for financial reasons. In addition, such measurements are capable of providing only the average velocity of the water flow and not its mass flow rate. In addition, these methods require preliminary calibration, even when merely determining the velocity of the water flow, in other words, the response of the tool to given external conditions is measured, i.e. to different flow velocities, flow rates, and radial flow distances, in order to obtain a set of reference signals; these reference measurements which are assumed to correspond to the "stationary" oxygen as opposed to the moving oxygen representative of the flow itself are then subtracted from the real measurements; calibration may be performed either using laboratory equipment specially constructed for this purpose or else in a portion of the well that is assumed to be free from any flow of water, but which nevertheless has characteristics that are identical to the characteristics of the portions of the well being inspected. However, the calibration operation is lengthy and therefore expensive. In addition, if performed in the well, it is of relatively low reliability since there is no way of ensuring that the region selected as a reference is indeed representative and free from any flow of water. Finally, known methods suffer from limitations concerning the range of flow velocities that can be detected accurately, in particular when velocities are relatively low, e.g. below 0.016 meters per second (3 feet per minute). This results in part from limitations due to the above-described calibration. This disadvantage is all the greater as the water flow velocities generally encountered in wells are often low, i.e. about or less than 0.016 meters per second.

Furthermore, the oxygen activation method raises another difficulty. The emitted neutrons interact with, and therefore activate, any oxygen atoms present around the tool, i.e. both "moving oxygen" and "stationary oxygen". Stationary oxygen is to be found mainly in the underground formation and in the cement. The moving oxygen is the oxygen present in the fluids flowing downwards or upwards along the well. It is therefore important to separate the stationary oxygen from the moving oxygen since it is only the moving oxygen that is of interest since it represents the flow of water.

Variants of methods relying on oxygen activation use a single detector and rely on adapting the displacement speed of the sonde as a function of the flow speed of the water, as described, for example, in the article entitled "Examples of detection of water flow by oxygen activation on pulsed neutrons logs" by W. H. M. DeRosset, in the CCC heading of SPWLA 27 Annual Logging Symposium of 9–13 June 1986. However, that method relies on preliminary or estimated knowledge of the flow speed of the water, and it is also sensitive to the spacing between the source and the detector.

European patent application No. 0 421 844 entitled "Nuclear oxygen activation method and apparatus for detecting and quantifying water flow", discloses a method and a sonde based on oxygen activation and seeking to enable water flow velocity to be determined. In the method described in that European patent application, a relationship representative of the flow (moving oxygen) is extracted from a (preferably graphic) representation of the number of gamma rays detected (or of the count rate) as a function of time. A characteristic of that relationship leads to the flow velocity of water in simple manner. Provision is also made for subtracting from the measurement, those gamma radiation counts that constitute "background noise" and that are constituted mainly by gamma rays produced by the radioactive elements present in the cement and in the underground formation. The graphic representation takes different shapes as a function of the duration of neutron emission (i.e. the irradiation duration), and as a function of the distance between the detector and the neutron source. Nevertheless, the portion of the curve representative of the flow is identifiable in the overall curve and may be deduced therefrom.

The method proposed in that European patent application gives satisfaction. However, although it is useful to know the velocity of the water flow, the information which is generally most required is the quantity of water that is flowing; in this respect the preferred parameter is flow rate. The method described in the above-mentioned European patent application provides for the mass flow rate of the flow being determined by means of a formula based on the velocity of the flow as measured by the above-mentioned method. Although constituting useful additional information about the flow, the method proposed for determining the flow rate suffers from certain limits. In particular, the flow rate is based, amongst other parameters, on velocity which is, in fact, a mean velocity that may merely be an approximation, in certain circumstances. In addition, the velocity measurement has relatively low accuracy, both for high velocities (greater than 50 m/s) and for low velocities (less than 0.01 m/s). Alternatively, that European patent application proposes another method for determining the mass flow rate, based on preliminary establishment of a reference curve for gamma radiation count rate as a function of flow rate. This reference curve is established before performing the measurement, e.g. in a laboratory installation. Thereafter, during real measurement, the total number of gamma rays representative of the flow is determined from the characteristic curve of the flow (gamma number as a function of time). The looked-for mass flow rate is the rate on the reference curve that corresponds to the real count number. This alternative method assumes that a reference curve has been established, thereby complicating the procedure and increasing costs.

In conclusion, the method and its variants proposed in the above-mentioned European patent application, although satisfactory overall, is nevertheless capable of being improved.

SUMMARY OF THE INVENTION

To this end, the invention proposes remedying the drawbacks of the above-mentioned prior techniques by proposing a method and an apparatus (a sonde) for accurately and reliably determining the quantity of water (e.g. the mass flow rate) of a flow of water that is not directly accessible.

To this end, the invention provides a method for determining qualitative and/or quantitative information concerning an inaccessible flow of water, the method comprising the steps of:
  irradiating said flow by means of a source of neutrons at an energy sufficient for the interaction between the emitted neutrons and the oxygen atoms of the water to create an activation reaction $O^{16}(n,p)N^{16}$;
  detecting the gamma rays emitted during said activation reaction in at least one zone that is longitudinally spaced apart from said source;
  counting during a given length of time (detection duration), the respective numbers of gamma rays detected during each time unit in said duration;
  establishing the general spectrum $g(t)$ of said numbers as a function of time over said detection duration;

extracting a special spectrum f(t) representative of said flow from said general spectrum g(t);

multiplying said special spectrum f(t) by a function h(t) representative firstly of the time decay in the gamma emission and secondly of the transit time of oxygen atoms between the source and the detection zone; and integrating the product f(t).h(t) with respect to time between two instants t1 and t2 belonging to said detection duration, the result of said integration containing the information relating to the water flow.

Advantageously, the function $h(t)=e^{\lambda t}/t^2$, and the mass flow rate is deduced by integration.

Preferably, t1 and t2 are such that f(t1) and f(t2) are substantially equal to zero.

In a preferred implementation, that said integration duration is shorter than said detection duration.

The invention also provides apparatus for evaluating a flow of water along a well, the apparatus comprising:

means for irradiating said flow from a source of neutrons at sufficient energy for the interaction between the emitted neutrons and the oxygen atoms in the water to establish an activation reaction $O^{16}(n,p)N^{16}$;

means for detecting gamma rays emitted during said activation reaction, said means being longitudinally spaced apart from said source;

means for counting during a given length of time (detection duration), the respective numbers of gamma rays detected for each unit of time in said detection duration;

means for establishing the general spectrum g(t) of said numbers as a function of time during said detection duration;

means for extracting a special spectrum f(t) representative of the flow from said general spectrum g(t);

means for multiplying the special spectrum f(t) by a function h(t) representative firstly of the time decay in gamma emission, and secondly of the transit time of oxygen atoms between the source and the detection means; and means for integrating the product f(t).h(t) with respect to time between two instants t1 and t2 belonging to the detection duration, the result of the integration containing information relating to the flow of water.

DESCRIPTION OF THE DRAWINGS

The invention will be well understood in the light of the following description of an implementation of the invention which refers to the accompanying drawings, in which:

FIG. 3 is a graph showing an example of the curve that results from a measurement, and showing the relationship between count rate and time;

FIG. 4 is a graph showing a curve similar to FIG. 3, but for a longer duration of irradiation;

FIGS. 5A and 5B are diagrammatic graphs showing count rates as a function of time, showing the respective contributions of various origins to the count rates;

DETAILED DESCRIPTION OF THE INVENTION

Figure 1:
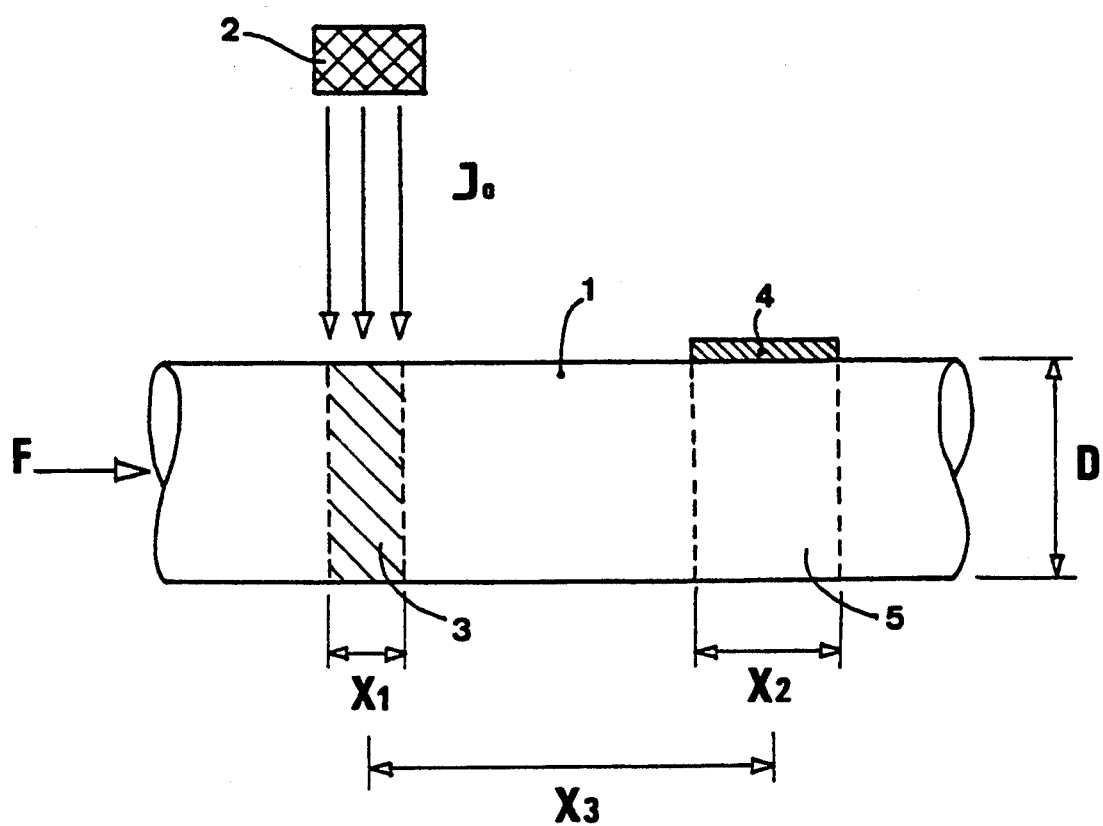
FIG. 1 is a diagram showing the principle on which the measurement of the invention is based.

FIG. 1 is a diagram showing the general principle of measurement based on activating atoms of oxygen in a flow of water along a pipe 1, as symbolized by arrow F. A high energy neutron source 2 emits neutrons with flux Jo transversely relative to the longitudinal direction of the pipe 1. Thus, an annular section of water of length X1 is subjected to this neutron bombardment. The oxygen atoms contained in the water are activated, and as a result they pass to an unstable state in the form of $N^{16}$, which state reverses radioactively in compliance with a relationship that decreases exponentially with time to a stable state by emitting gamma radiation at an energy of 7.12 MeV. This activation reaction is generally known in the form $O^{16}(n,p)N^{16}$. The annular section of the water flow given reference 3 and carrying activated oxygen atoms moves inside the pipe and passes in front of a detector 4 disposed at a distance X3 from the source 2. The length in the longitudinal direction of the annular detection section is given reference X2. The unstable $N^{16}$ atoms in the "slice" of water 5 situated facing the detector 4 emit gamma rays that are detected by the detector 4. Thus, a count of this gamma radiation is representative of the quantity of oxygen and thus of the quantity of water in the pipe. More precisely, the number of counts from the detector 4 corresponds to the number of gamma rays detected and is proportional to the quantity of oxygen.

FIG. 1 is deliberately diagrammatic and its only purpose is to show the general principle of measurement based on oxygen activation. As mentioned above, the invention may be applied to detecting and/or determining the physical parameters of a flow of water (e.g. its flow rate) in a pipe conveying a mixture of hydrocarbons and water. For example, the measurement may be performed outside a pipe conveying the flow from a hydrocarbon well to a storage tank on the surface.

In another application, the apparatus and the method of the invention may be implemented in a logging sonde adapted to be lowered down a producing oil well.

Figure 2:
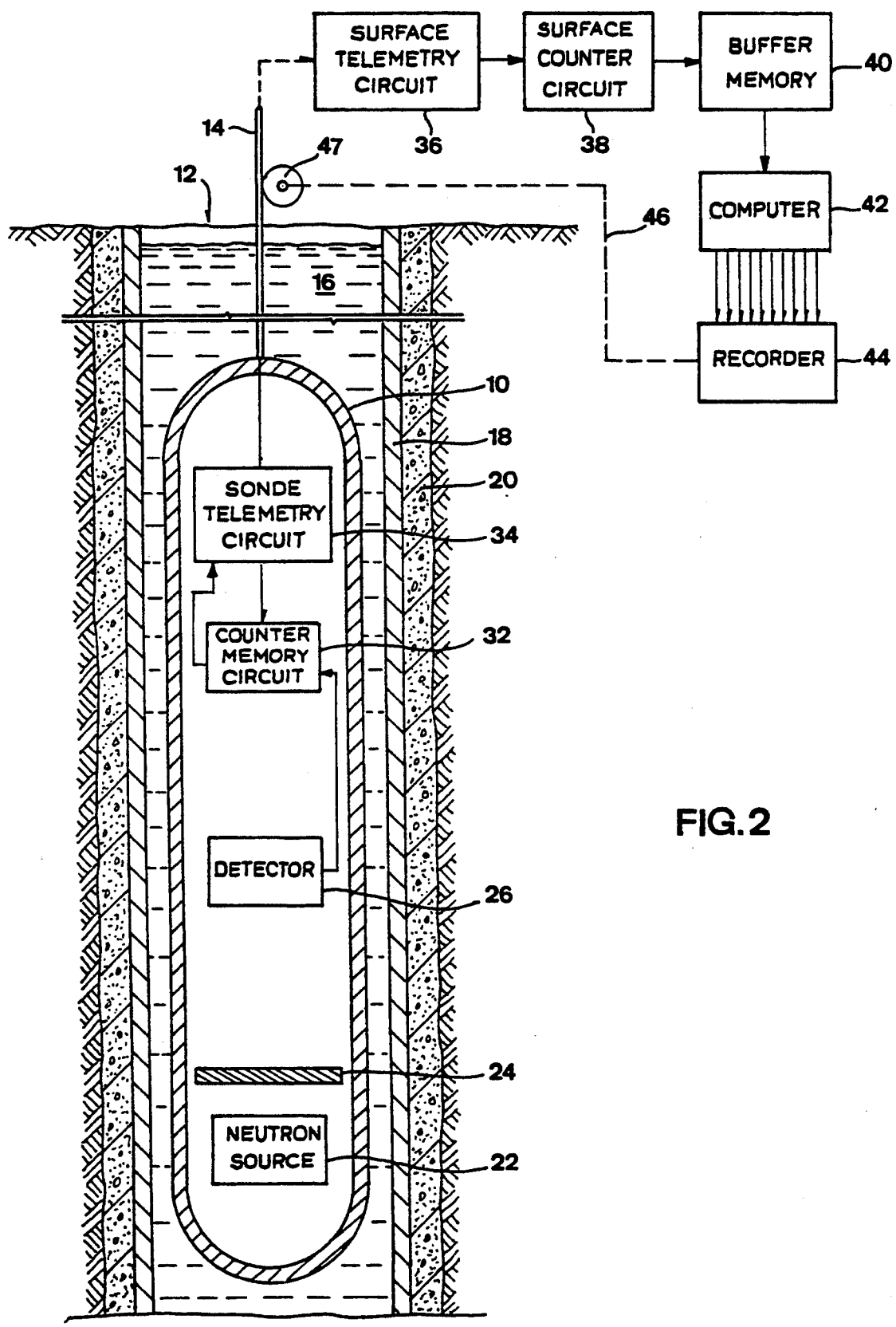
FIG. 2 is a diagram showing an apparatus of the invention adapted to measurements in a hydrocarbon well.
Figure 6:
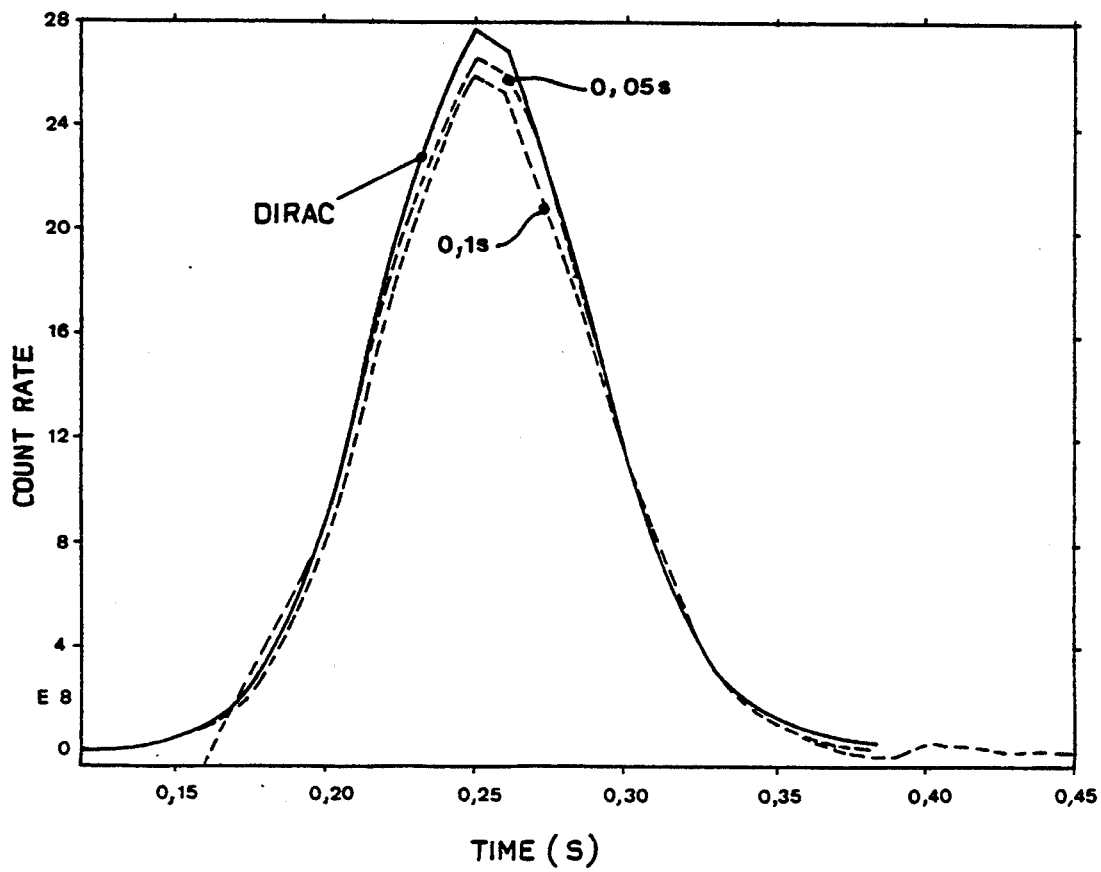
FIG. 6 is a graph showing three curves of count rates as a function of time, for three neutron emission pulses of different durations.

FIG. 2 shows such a logging sonde 10 capable of being lowered down a hydrocarbon well 12 on a cable 14. The sonde 10 is of the nuclear spectroscopy type, and, for example, it may be of the type described in U.S. patent application No. 4,721,853, to which reference may be made for a more detailed description.

As shown in FIG. 2, the sonde comprises a metal shell capable of withstanding high pressure and high temperature, and which is tight against the fluid 16 present in the well 12. The well is provided with steel casing 18. The annular space between the casing 18 and the wall of the well 12 is filled with cement, referenced 20. For reasons of clarity and of simplification, none of the tubing has been shown in the drawings, even though the well 12 may be provided with such tubing, as is conventional in the prior art.

The logging sonde 10 includes a neutron source 22, and a gamma ray detector 26 disposed at a certain distance from the source 22 in the longitudinal direction of the sonde. A screen or shield 24 is disposed between the source and the detector 26 in order to avoid any direct radiation interference between the detector 26 and the source 22. By way of illustration, the neutron source 22 may be of the "pulsed" type suitable for generating discrete pulses of fast neutrons, e.g. at about 14 MeV, and is preferably of the type described in greater detail in U.S. Pat. Nos. 2,991,364 and 3,546,512. The source 22 emits neutrons at an energy level of 14 MeV which is greater than the 10.2 MeV required for activating atoms of oxygen. The operation of the neutron source 22 is controlled, in conventional manner, by a source control circuit (not shown and known per se), and may likewise be of the type described in the above-mentioned US patents. The detector 26 may be of any known type for detecting gamma rays, such as a scintillation detector or a detector based on a crystal of bismuth germinate (BGO), or of the gadolinium orthosilicate type (GSO). In known manner, the detector 26 comprises photomultiplier tubes, high tension power supplies for the photomultiplier, and discriminator/amplifiers (which items are not shown in the drawings for reasons of clarity). It will also be understood that other power supplies are disposed in the sonde 10 for the purpose of powering and controlling the neutron source 22 and the other circuits located in the sonde. Power is supplied to the sonde 10 via cable 14, connected to a power supply on the surface (not shown and known per se).

The output pulses from the detector 26 are applied to a counting circuit 32 where the signals from the detectors are counted and stored in memory and are then applied to a telemetry circuit of the sonde (referenced 34), which circuit serves to transmit data to the surface via the cable 14. The circuit for controlling the neutron generator, the counting and memory circuit 32, and the telemetry circuits 34 are similar to those described in U.S. Pat. No. 4,721,853, and they are not described in greater detail herein for reasons of conciseness. The circuits are designed to enable neutrons to be emitted and gamma rays to be detected at a rate that is determined and described in greater detail below. The telemetry circuit 34 of the sonde may be of any conventional structure serving to encode and time-multiplex the signals that convey information (or to perform any other shaping step thereon). On the surface, the signals conveying information from the detector 36 are amplified, decoded, demultiplexed, and processed in conventional manner in a surface telemetry circuit referenced 36 and of known design. The sonde telemetry circuits 34 and the surface telemetry circuits 36 also include circuits for respectively receiving and transmitting control messages coming from the surface, and in this respect they advantageously include a telemetry system for two-way transmission of data and capable of transmitting information at a rate of not less than 10 Kbits per second. The signals from the surface telemetry circuits 36 are injected into a counting circuit 38 disposed on the surface and designed to accumulate data in the form of "counts" corresponding to the number of detected gamma rays over a given period of time, with said count data being transferred to a buffer memory 40. The count data is then conveyed from the buffer memory 40 to an acquisition system 42 which preferably includes a microprocessor, or alternatively a digital computer such as that manufactured by Digital Equipment Corporation of Maynard, Mass., USA, under the tradename PDP-11. The acquisition system 42 processes the count data from the detector and at its output it delivers displays of said data which are recorded in a recorder 44 as a function of the depth of the sonde down the well. To this end, a link 46 is provided between the recorder 44 and a sonde depth measuring device 47 associated with the cable 14.

FIGS. 3 and 4 are graphs showing count data expressed as a function of time over a given period of time, e.g. of the order of 60 seconds. These curves are the result of processing the data from the acquisition system 42 (FIG. 3). The count rate must be understood as being the number of "counts" detected per unit time (of the order of a few milliseconds), and divided by the duration of the time unit. The count rate scale given in FIGS. 3 and 4 is purely arbitrary.. It should also be observed that the ordinate could equally well be label led either "count numbers" or else "count rates", which means that a mere change of scale does not change the principle on which the invention is based. Consequently, the term "number of counts as a function of time" should be understood below as being a count rate as a function of time (unless specified otherwise).

The measurement principle is based on neutrons being emitted in the form of close-together pulses over a duration of the order of a few seconds, e.g. 2 seconds. The neutron emission time (or "irradiation" time) is interrupted and followed substantially immediately by a "detection" time of the order of 10 seconds to 200 seconds, and preferably lying in the range 50 seconds to 80 seconds. In FIGS. 3 and 4, the irradiation or neutron-emission time lies between instant 0 and t1 or instant 0 and t'1, respectively. In FIG. 3, the emission time is 2 seconds, whereas in FIG. 4, the emission time is about 70 seconds. Other things being equal, it can thus be seen that the duration of neutron emission has an effect on the shape of the curve of count rate as a function of time. Starting detection only after irradiation has stopped is preferred, but the invention is not limited thereto.

Each of FIGS. 3 and 4 shows three curves: a solid line curve corresponding to the total detected count numbers, i.e. to the total number of gamma rays that result from oxygen atom activation (and possibly also from other atoms that may be activated). The dashed line curve 320 corresponds to the number of counts detected and recorded that represent stationary oxygen atoms, i.e. oxygen atoms that are present in "bound" water, i.e. oxygen present in the pores of the geological formation close to the sonde. Curve 350 in dotted lines corresponds to the number of counts representative of moving oxygen, i.e. representative of the flow under investigation. The solid line curve begins with a rising portion 310 up to the instant t1, followed by a portion that generally has a peak 330 followed by an exponential drop 340 and finally by a substantially horizontal portion 360. The dash line curve (representative of stationary oxygen) is constituted by a curve of exponential decrease starting from instant t1, i.e. substantially from the beginning of the detection time. The decreasing exponential curve is extended by a substantially horizontal portion 360 which corresponds to background noise. Curve portion 330 as constituted by the peak and associated with dashed line curve 320 defines an area shaded gray which includes the information relating to moving oxygen, i.e. representative of the water flow.

In FIG. 4, the portion of the curve representative of the flow defines an area shown in dark gray which is different from that shown in FIG. 3, and in FIG. 4 it is in the form of a sudden drop (reference 410) extended by the end exponentially decreasing portion (reference 420) representative of stationary oxygen. The term "sudden drop" means that the curve has a detectable change in curvature or slope compared with the exponentially decreasing curve representative of stationary oxygen. The continuous line curve representative of the total number of counts is obtained after switching on the neutron source for a length of time that is sufficient to enable the count rate to reach a level that remains stable in time (horizontal portion 400 of the curve in FIG. 4 terminating at point A). The instant t'1 at which the neutron source ceases emitting corresponds to point A on the curve. Point B in FIG. 4 is determined by extrapolating 430 to the instant t'1 from the decreasing exponential curve referenced 420. The shaded area in FIG. 4 represents the portion characteristic of the flow. Starting from point A, this area is delimited by the sudden drop 410, the extrapolated portion (430) of the exponential drop, and vertical segments AB corresponding to instant t'1.

FIGS. 5A and 5B show curves similar to those shown in FIG. 3, except that the curves shown in FIGS. 5A and 5B show, diagrammatically, the count rates obtained in each detection time interval. The irradiation time period is about 2 to 3 seconds. Each of the histograms in FIGS. 5A and 5B has respective shaded portions 50 and 51 corresponding to the irradiation time period, 52 and 53 corresponding to the background noise count, 54 and 55 corresponding to the stationary oxygen, and finally 56 and 57 representative of the flow. Shaded zones 56 and 57 delimit peaks characteristic of the flow and are separated from respective stationary oxygen shaded zones 54 and 55 by decreasing exponential curves given respective references 58 and 59.

The person skilled in the art will find further information and greater details concerning the above-mentioned elements in above-mentioned European patent application No. 0 421 844.

The method and the apparatus of the preferred implementation of the invention are described below in detail.

The invention comprises the following steps:
the sonde is held stationary in the well at a depth corresponding to the zone to be inspected;
the neutron source is activated for several seconds and is then stopped;
substantially immediately after neutron emission is stopped, the gamma radiation resulting from oxygen atom activation is detected;
a time spectrum is generated (i.e. count rate as a function of time), of the type as shown in FIGS. 3, 4, 5A, or 5B, and the contributions of background noise, and of stationary oxygen (as delimited on the time spectrum by the decreasing exponential curve) are extracted from said time spectrum, thereby obtaining the characteristic portion of the spectrum and respectively referenced 330, 410, 56, and 57 in FIGS. 3, 4, 5A, and 5B;
the characteristic portion of the time spectrum constituted by a time function f(t) is multiplied by a function $h(t) = e^{\lambda t}/t^2$;
the product obtained in this way is integrated in time over a given period interval (t1, t2); and
the resulting product is multiplied by calibration constants representative of geometrical factors, in particular, with the result obtained in this way being equal to the mass flow rate of the flow of water in the type under investigation.

The steps mentioned above may be expressed by the following mathematical formula:

$$Q = \frac{\int_0^\infty f(t) \frac{e^{\lambda t}}{t^2} dt}{\lambda C_{tool}} J \quad (1)$$

where J is the neutron flux emitted by the source, Q is the mass flow rate, f(t) is the function representing the portion of the spectrum characteristic of the flow, $\lambda$ is the de-excitation constant of $N^{16}$ ($\lambda = 0.097 s^{-1}$), t represents time, and $C_{tool}$ is a constant representative of the sonde.

Figure 7:
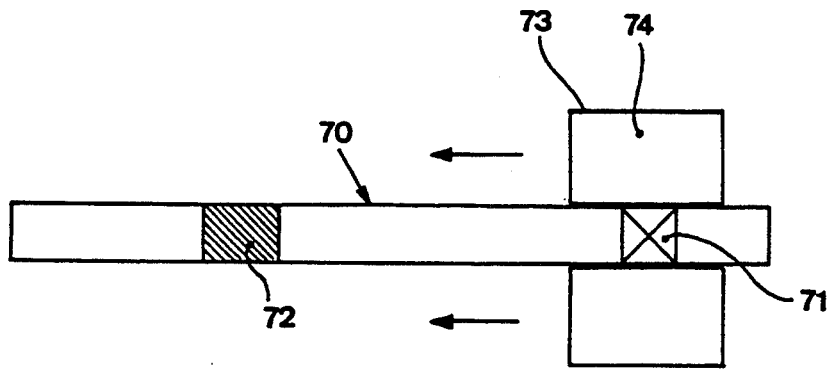
FIG. 7 is a diagram showing an example of apparatus for determining calibration parameters.

The constant $C_{tool}$ is determined by a calibration device, e.g. in a laboratory, before performing the measurements, and as shown diagrammatically in accompanying FIG. 7. The device comprises a tube 70 having a length of 2 to 3 meters, for example, and containing, substantially at respective ends of the tube 70, firstly a neutron source 71 and secondly a gamma detector 72. The calibration device also includes a sleeve which is generally in the form of a cylindrical ring whose central opening is complementary in size to the tube 70. The ring is made of a neutral material, such as plastic, and it defines a cavity 74 surrounding the tube 70 over a certain length thereof in the longitudinal direction of the tube 70. The cavity 70 is filled with water. The ring 73 is suitable for being displaced longitudinally from a first position close to the source, as shown in FIG. 7 to a second position surrounding the detector 72. In its starting position, the ring is disposed so that it surrounds the source 71. The source is activated and emits neutrons during a period of 1 to 2 seconds. At this instant, or substantially immediately after said instant, the gamma radiation sensor is switched on. The ring 73 filled with water is then displaced along the tube 70 until it reaches the position in which it surrounds and even significantly passes beyond the detector 72. Throughout the detection period gamma rays emitted by the activated oxygen atoms in the water-filled cavity 74 are detected and counted. The count rates as a function of time are recorded, the reby obtaining a time spectrum like those shown in one of FIGS. 3, 4, 5A, or 5B. The operation is then repeated for a displacement velocity of the ring that is different from its first displacement speed. Two different time spectra are thus obtained from which it is easy to derive a constant $C_{tool}$ characteristic of the gamma detector and of the neutron source (i.e. substantially off the sonde assembly), given that other things remain equal from one measurement to the next.

In order to increase the reliability of the results obtained, and in particular to escape from the statistical aspect of nuclear measurements, the emission and subsequent detection are repeated over a plurality of successive cycles. For example, the measurement may be repeated about ten times. Alternatively, the measurements are repeated until a given statistical threshold is achieved.

The detection duration is similarly given by way of example as being substantially equal to 60 seconds. The detection duration may be adjusted, and in particular reduced, in order to reduce the time required for performing the measurement and thus the time during which the sonde needs to be kept stationary in the well. To this end, the apparatus of the invention may include count rate comparator means for comparing the count rate at each instant with a threshold count rate close to 0. Thus, after subtracting from the total count rate firstly the count rate representative of the background noise and secondly the count rate representative of the exponential drop due to the stationary oxygen (thereby obtaining the count rate curve as a function of time that is representative of the moving oxygen), the real count rates for each time unit in the time during which detection takes place is compared with said threshold. As soon as the count rate becomes less than or equal to the threshold value, the comparator apparatus records and stores the value of the corresponding time unit. A time interval between t1 and t2 is thus defined beyond and beneath which the count rate becomes negligible (below the threshold value). The integration step, as mentioned above, is thus performed over a time period extending between the instants t1 and t2.

The contribution of background noise to the total count rate can be calculated by determining the value of the count rate corresponding to the substantially horizontal rectilinear portion of the count rate curve as a function of time that results from the total spectrum. In the example shown in FIGS. 3 and 4, the rectilinear portion is referenced 360 and 440, respectively. Alternatively, in a variant, the contribution of background noise can be determined by calibration, prior to performing measurements.

It is also possible to introduce a correction factor to take account of the position of the sonde in the well, depending on whether the sonde is centered or is eccentric within the well. This phenomenon occurs mainly in sloping wells since the sonde takes a position in the bottom portion of the right cross-section of the well due to gravity. The correction gives rise to a multiplicative factor of the type $e^{-(\mu_n + \mu_g)r}$ where aen and aeg are attenuation parameter factors respectively for the neutrons and for the gamma rays $\mu_n = (10.1)^{m-1}$ and $\mu_g = 3^{-1}$.

It is important to observe that the method of the invention theoretically requires only one detector. Nevertheless, in order to improve measurement accuracy, it is possible to provide a plurality of detectors disposed longitudinally on the same side of the source. Likewise, as a function of the application, it is also possible to provide multiple detectors disposed at the same distance from the source about the pipe being inspected, the detectors thus being placed at the same annular section coaxial with the duct in which the water is flowing.

Further, the invention has been described as implementing an irradiation period of a few seconds which is interrupted and immediately followed by a detection period. This is a preferred mode of implementation. Nevertheless, it is quite possible to implement the invention in a different sequence, in particular by emitting neutrons for a relatively long period of time (of the order of 30 seconds to 100 seconds) and by beginning the detection period before the irradiation period has terminated. A time spectrum of the type shown in FIG. 4 is then obtained. The activation time must be short relative to the transit time of the flow of water between the source and the detector. Account must also be taken of the performance of the neutron generator when determining the activation time.

Advantageously, the apparatus of the invention includes means enabling a correction to be made for the contribution to the total count rate due to gamma rays that result from atoms other than atoms of oxygen being activated, e.g. atoms of sodium or aluminum. In this respect, it is advantageous to provide a correction when the flow of water under investigation comprises a flow of brine.

The effects of brine on the flow can be corrected for by spectroscopic analysis, i.e. by discriminating the energies of the detected gamma rays. Gamma rays from activated atoms of oxygen are at an energy which is different from gamma rays that result from the activation of atoms of sodium, for example. Such spectroscopic analysis is associated with the use of a GSO type detector responsive to gamma rays. Another solution, in the absence of a spectroscopic processor device, consists in determining the salt concentration and in deducting from the total count rate the contribution of gamma rays that result from activating atoms of sodium. The pre-established relationship between count rates and salt concentration is linear. Experimentally, the signal from water having a salt concentration of 1% is substantially equal to the signal from fresh water multiplied by constant $a = 1 + 0.022$.

The accuracy of the method of the invention in determining mass flow rate is about 15% for flows of greater than 500 barrels per day (i.e. about 80 m³/day) and is about 30% for flow rates below said value.

The detector is advantageously placed at a distance from the source such that the transit time is of an order of magnitude comparable to the deactivation time (7.16 s). For example, the detector may be placed in the range 30 cm to 500 cm from the neutron source. Depending on the flow velocity, it is possible to use a distant detector (200 cm to 500 cm) for high velocities, whereas a near detector at 30 cm to 200 cm is used for low velocities.

The neutron source and the detector are preferably collimated respectively to emit and to detect radiation in a direction substantially perpendicular to the flow direction of the water being inspected.

The method of the invention enables the mass flow rate or the ratio of water to hydrocarbons to be determined easily, using calibration constants that are independent from the flow itself.

By using a plurality of detectors, it is possible to increase the available detection data and to reduce the effects of attenuation phenomena; such a solution is preferable to increasing the emission power of the neutron source.

The method and apparatus of this invention provides significant advantages over the current art. This invention has been described in connection with its preferred implementations. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method of studying a flow of water along a well, the method comprising the steps of:
   irradiating said flow by means of a source of neutrons at an energy sufficient for the interaction between the emitted neutrons and the oxygen atoms of the water to create an activation reaction $O^{16}(n,p)N^{16}$;
   detecting gamma rays emitted during said activation reaction in at least one zone that is longitudinally spaced apart from said source;
   counting during a given length of time (detection duration), the respective numbers of gamma rays detected during each time unit in said duration;

establishing a general spectrum g(t) of said numbers as a function of time over said detection duration;

extracting a special spectrum f(t) representative of said flow from said general spectrum g(t);

multiplying said special spectrum f(t) by a function h(t) representative firstly of the time drop in the gamma emission and secondly of the transit time of oxygen atoms between the source and the at least one zone; and integrating the product f(t).h(t) with respect to time between two instants t1 and t2 belonging to said detection duration, the result of the integration containing the information relating to the flow of water.

2. A method according to claim 1, wherein the function $h(t) = e^{\lambda t}/t^2$, where $\lambda$ is the de-excitation constant of $N^{16}$.

3. A method according to claim 1, wherein t1 and t2 are such that f(t1) and f(t2) are substantially equal to zero.

4. A method according to claim 1, wherein the integration duration (t1, t2) is shorter than said detection duration.

5. A method according to claim 4, wherein said integration duration (t1, t2) is modulatable.

6. A method according to of claim 1, wherein the steps of irradiating detecting, counting, and spectrum establishing are repeated over a plurality of successive cycles so as to obtain a general spectrum g(t) that is the result of accumulated measurements derived from the respective preceding cycles.

7. A method according to claim 1, wherein the detection duration follows substantially immediately after the irradiation duration.

8. A method according to claim 1, wherein the irradiating step includes a succession of neutron emission pulses, each pulse being in the form of a Dirac pulse.

9. A method according to claim 8, wherein the product f(t).h(t) is multiplied by a correction function J(t) for taking into account the difference between the real emission spectrum and said succession of Dirac pulses.

10. A method according to claim 1, wherein the detecting step includes a step of correcting possible variation in time in the emission rate of the neutron source.

11. A method according to claim 1, wherein the gamma rays are detected in a plurality of zones that are longitudinally spaced apart relative to said source.

12. A method according to claim 1, further comprising a step of correcting the count rate to take account of the activation of atoms other than atoms of oxygen.

13. A method according to claim 12, wherein the correcting step includes an energy filtering step applied to the detected gamma rays on either side of a theoretical energy peak (6.13 MeV) for gamma rays emitted by the oxygen activation reaction.

14. A method according to claim 12, wherein a section of the flow is split up into successive equal-length longitudinal slices, with the gamma rays issuing from each slice being detected independently, and with the results from the individual slices being summed.

15. A method according to claim 1, wherein the source is installed and the gamma rays are detected inside a pipe conveying the flow under inspection, and in that the said time spectrum is corrected as a function of the transverse positions within the type of the source and of the at least one zone.

16. A method according to claim 1, further comprising the steps of: determining the mean velocity of the flow of water using one of the characteristics of the special spectrum f(t) representative of the flow (count rate/time);

multiplying said mean velocity by the quantity obtained by integrating the product f(t).h(t);

multiplying the result obtained in this way by at least one constant wherein said at least one constant is representative of the geometrical and physical conditions under which said gamma rays were detected; and deducing the mass flow rate of the water flow from the result.

17. A method of studying a flow of water along a well from a general spectrum g(t) of gamma ray detection numbers in a detection zone during a given detection duration, as a function of time, said gamma rays resulting from the activation of oxygen atoms by neutrons emitted by a source, the method including the steps consisting in:

extracting a special spectrum f(t) representative of said flow from said general spectrum g(t);

multiplying said special spectrum f(t) by a function h(t) representative firstly of the time decrease in gamma ray emission and secondly of the transit time of oxygen atoms between the source and the detection zone; and integrating the product f(t).h(t) over time between two instants t1 and t2 belonging to said detection duration, the result of said integration containing information relating to the quantity of water flowing.

18. Apparatus for studying a flow of water along a well, the apparatus comprising:

means for irradiating said flow from a source of neutrons at sufficient energy for the interaction between the emitted neutrons and the oxygen atoms in the water to establish an activation reaction $O^{16}(n,p)N^{16}$;

means for detecting gamma rays emitted during said activation reaction, said means being longitudinally spaced apart from said source;

counter means for counting during a given length of time (detection duration), the respective numbers of gamma rays detected for each unit of time in said detection duration;

means for establishing the general spectrum g(t) of said numbers as a function of time during said detection duration;

means for extracting a special spectrum f(t) representative of the flow from said general spectrum g(t);

means for multiplying the special spectrum f(t) by a function h(t) representative firstly of the time decrease in gamma emission, and secondly of the transit time of oxygen atoms between the source and the detecting means; and means for integrating the product f(t).h(t) with respect to time between two instants t1 and t2 belonging to the detection duration, the result of the integration containing information relating to the flow of water.

19. Apparatus according to claim 18, including means for modifying the integration time.

20. Apparatus according to claim 18, further including calibration means suitable for determining at least one independent constant of the flow, prior to performing measurements on the flow.

21. Apparatus according to claim 19, further including calibration means suitable for determining at least one independent constant of the flow, prior, to performing measurements on the flow.

22. Apparatus according to claim 18, wherein the irradiating means are suitable, during an irradiation duration, for emitting a succession of neutron pulses, each substantially equivalent to a Dirac pulse.

23. Apparatus according to claim 18, wherein the detecting means comprise a single detector.

24. Apparatus according to claim 18, placed outside and adjacent a pipe in which a mixture of water and hydrocarbons is flowing.

25. Apparatus according to claim 19, placed outside and adjacent a pipe in which a mixture of water and hydrocarbons is flowing.

26. Apparatus according to claim 20, placed outside and adjacent a pipe in which a mixture of water and hydrocarbons is flowing.

27. Apparatus according to claim 24, wherein the detecting means include at least two gamma ray detectors situated at the same distance from the source and disposed on either side of the pipe in a plane that extends transversely to the longitudinal direction of the pipe.

28. Apparatus for studying a flow of water along a well, on the basis of a general spectrum $g(t)$ of the number of gamma rays detected in a detection zone during a given detection duration and as a function of time, said gamma rays resulting from the activation of atoms of oxygen by neutrons emitted from a source, the apparatus comprising:

means for extracting a special spectrum $f(t)$ representative of said flow from said general spectrum $g(t)$;

means for multiplying said special spectrum $f(t)$ by a function $h(t)$ representative firstly of the time decrease in the emission of gamma rays and secondly the transit time of oxygen atoms between the source and the detection zone; and means for integrating the product $f(t).h(t)$ over the time between two instants $t1$ and $t2$ belonging to said detection duration, the result of the integration containing information relating to the flow of water.

* * * * *